United States Patent
Balster et al.

(10) Patent No.: US 9,464,004 B2
(45) Date of Patent: Oct. 11, 2016

(54) METHOD FOR MANUFACTURING CERAMIC HONEYCOMBS WITH REDUCED SHRINKAGE

(75) Inventors: Jean E Balster, Corning, NY (US); Michael P Brown, Painted Post, NY (US); Thomas James Deneka, Painted Post, NY (US); Joshua L Howell, Elkland, PA (US); Daniel Edward McCauley, Watkins Glen, NY (US)

(73) Assignee: Corning Incorporated, Corning, NY (US)

( * ) Notice: Subject to any disclaimer, the term of this patent is extended or adjusted under 35 U.S.C. 154(b) by 576 days.

(21) Appl. No.: 13/036,596

(22) Filed: Feb. 28, 2011

(65) Prior Publication Data
US 2012/0217669 A1     Aug. 30, 2012

(51) Int. Cl.
| | |
|---|---|
| C04B 38/00 | (2006.01) |
| C04B 35/64 | (2006.01) |
| C04B 35/195 | (2006.01) |
| B28B 11/24 | (2006.01) |
| B28B 17/00 | (2006.01) |
| C04B 35/478 | (2006.01) |
| F27B 9/02 | (2006.01) |
| F27B 9/30 | (2006.01) |
| F27B 9/40 | (2006.01) |

(52) U.S. Cl.
CPC ......... *C04B 35/195* (2013.01); *B28B 11/243* (2013.01); *B28B 17/0072* (2013.01); *C04B 35/478* (2013.01); *C04B 38/0006* (2013.01); *F27B 9/028* (2013.01); *F27B 9/30* (2013.01); *F27B 9/40* (2013.01); *C04B 2235/656* (2013.01); *C04B 2235/9615* (2013.01)

(58) Field of Classification Search
CPC ... B28B 17/0072; F27B 9/40; C04B 35/478; C04B 38/0006; C04B 2235/656; C04B 2235/9615
USPC .......................................... 264/606, 630, 631
See application file for complete search history.

(56) References Cited

U.S. PATENT DOCUMENTS

| | | |
|---|---|---|
| 5,911,941 A | 6/1999 | Rokhvarger et al. |
| 6,089,860 A | 7/2000 | Dull et al. |
| 7,655,180 B2 | 2/2010 | Takeuchi et al. ............. 264/672 |

(Continued)

FOREIGN PATENT DOCUMENTS

| | | |
|---|---|---|
| CN | 1434000 | 1/2003 |
| JP | S63-1988-316104 A | 12/1988 |

(Continued)

OTHER PUBLICATIONS

Norton, F.H. Elements of Ceramics. Reading, MA, Addison-Wesley, 1970. p. 134.*

(Continued)

*Primary Examiner* — Erin Snelting
(74) *Attorney, Agent, or Firm* — Joseph M. Homa

(57) ABSTRACT

A method of manufacturing porous ceramic articles is provided that includes forming a plurality of extruded green bodies from a ceramic precursor batch composition. The method also includes firing the extruded green bodies in a tunnel kiln to produce porous ceramic articles, periodically determining a shrinkage characteristic of at least one sample passing through the tunnel kiln, and adjusting a top soak temperature in the kiln if the shrinkage characteristic is outside of a predetermined range.

18 Claims, 1 Drawing Sheet

(56) References Cited

U.S. PATENT DOCUMENTS

| | | | |
|---|---|---|---|
| 2006/0043648 A1 | 3/2006 | Takeuchi et al. | 264/639 |
| 2006/0246322 A1* | 11/2006 | Kawada et al. | 428/701 |
| 2008/0010960 A1 | 1/2008 | Paisley et al. | 55/523 |
| 2008/0116621 A1* | 5/2008 | Brennan et al. | 264/606 |
| 2008/0277043 A1 | 11/2008 | Yasuda et al. | 156/89.11 |
| 2010/0052197 A1 | 3/2010 | Deneka et al. | 264/40.4 |
| 2011/0190120 A1* | 8/2011 | Dien-Barataud et al. | 502/439 |

FOREIGN PATENT DOCUMENTS

| | | | |
|---|---|---|---|
| JP | 1-183475 | 7/1989 | |
| JP | H02-1990-255576 A | 10/1990 | |
| JP | 2000-510434 A | 8/2000 | |
| JP | 2001-527202 A | 12/2001 | |
| JP | 2006-62906 | 8/2004 | C04B 35/622 |
| JP | 2010216756 | 9/2010 | |
| WO | WO2009/110978 | 9/2009 | C04B 35/478 |
| WO | WO 2010001062 A2 * | 1/2010 | |
| WO | 2010027429 | 3/2010 | |
| WO | WO2011/025901 | 3/2011 | C04B 35/478 |
| WO | WO2011/026065 | 3/2011 | B28B 3/20 |

OTHER PUBLICATIONS

Taruta, Seiichi, et al., "Influence of Aluminum Titanate Formation on Sintering of Bimodal Size-Distributed Alumina Powder Mixtures", J. Am Ceram. Soc., 80 [3] (1997) pp. 551-556.
U.S. Appl. No. 12/550,620, filed Aug. 31, 2009, "Method of Making Ceramic Bodies Having Reduced Shape Variability".
"Preparing directional porous ceramic by directional solidifying and freeze drying", Lijuan Li et., al Chinese Ceramic, vol. 45, No. 12, pp. 57-60.
Japanese Office Action, dated Sep. 29, 2015, pp. 1-4, Japanese Application No. 2013-556714, Japan Patent Office, Japan.
Li, Lijuan et al., "Preparing directional porous ceramic by directional solidifying and freeze drying", Chinese Ceramic, vol. 45, No. 12, pp. 57-60.
Wang, Yong Hong et al., "Microstructure control of ceramic membrane support from corundum-rutile powder mixture", Powder Technnology, 168 (2006) pp. 125-133.
CN application No. 201280010628.9, dated Aug. 13, 2014, Notice on the first office action, 9 pages.
CN application No. 201280010628.9, dated Apr. 23, 2015, Notice on the second office action, 9 pages.
PCT Notification of Transmittal of the International Search Report and the Written Opinion of the International Searching Authority, PCT/US2012/025836, mailed May 11, 2012, 13 pages.

* cited by examiner

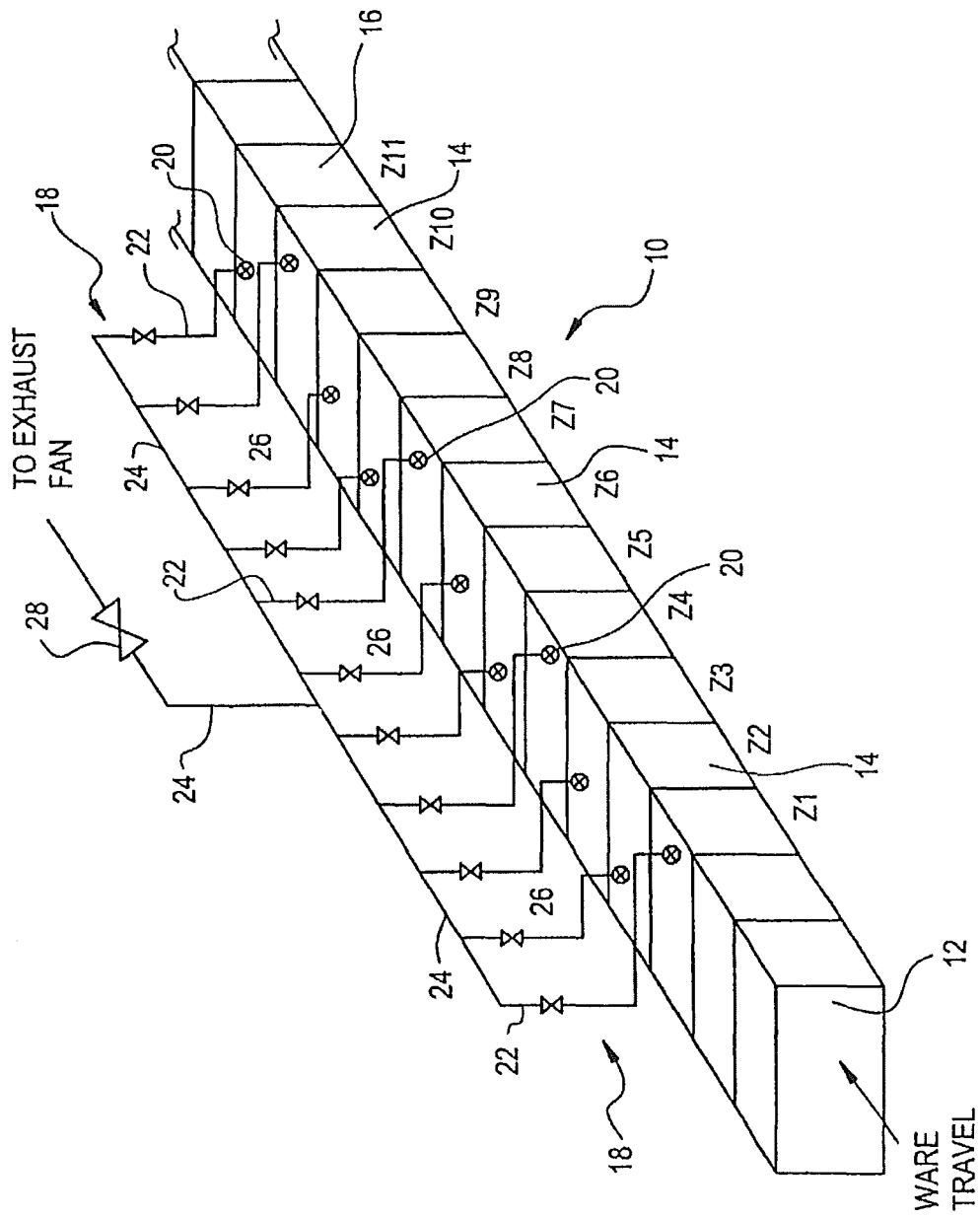

METHOD FOR MANUFACTURING CERAMIC HONEYCOMBS WITH REDUCED SHRINKAGE

BACKGROUND

The disclosure relates generally to methods for manufacturing ceramic materials and more particularly to methods of reducing shrinkage in shaped ceramic articles by adjusting the top soak temperature during firing.

Ceramic products of a honeycomb shape have been made by preparing a ceramic green body through mixing of ceramic materials with water and various carbonaceous materials (including extrusion and forming aids) to form a plasticized batch, forming the body into a honeycomb-shaped green body through extrusion of the plasticized batch, and finally firing the honeycomb-shaped ceramic green body in a firing furnace or kiln.

An important factor in the manufacture of honeycomb shaped ceramic articles is minimizing the variability in the shrinkage (or growth) of the ceramic articles during firing, particularly as a result of the sintering process. Product specifications require certain ceramic articles, such as diesel particulate filters (DPFs), to meet increasingly robust specifications with regard to shrinkage (or growth) variability from a target.

Most methods of minimizing the variability in the shrinkage (or growth) of ceramic articles have focused on controlling raw materials (or properties of raw materials) added to the initial batch composition. These methods often include controlling the particle size distribution (PSD) of batch constituents because when there is a significant change in the raw material particle size distribution, there is typically a subsequent high rate of change in shrinkage.

Methods of controlling PSD include measures such as selecting specific ratios of raw material batch constituents with known particle size distributions, calcining or milling raw material batch constituents to a defined particle size distribution, or controlling the rate at which raw material batch constituents are fed through a milling apparatus. However, even when these processes are combined with some sort of feedback control mechanism (e.g., measuring the shrinkage in the fired part and adjusting the raw material feed accordingly) substantial amounts of ware must often be discarded because much material is already in process downstream of raw material feed and mixing at the time it is determined that the raw material feed needs adjustment.

SUMMARY

One embodiment of the disclosure relates to a method of manufacturing porous ceramic articles. The method includes forming a plurality of extruded green bodies from a ceramic precursor batch composition. The method also includes firing the extruded green bodies in a tunnel kiln to produce porous ceramic articles, the tunnel kiln comprising a zone heated to a top soak temperature. In addition, the method includes periodically determining a shrinkage characteristic of at least one sample. The method further includes adjusting the top soak temperature if the shrinkage characteristic is outside of a predetermined range.

Another embodiment of the disclosure relates to a porous ceramic article made by the method described above.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 1 is a schematic view illustrating an exemplary tunnel kiln suitably capable of being used to carry out methods of manufacturing porous ceramic articles as disclosed herein.

DETAILED DESCRIPTION

Disclosed herein is a method of manufacturing porous ceramic articles including honeycomb-shaped porous ceramic articles, wherein the porous ceramic articles are passed through a tunnel kiln. The method can reduce the amount of shrinkage variability that would otherwise occur in the manufacture of the porous ceramic articles. Specifically, the method allows for the adjustment of a downstream processing parameter, namely the top soak temperature experienced by certain articles passing through the kiln. This can allow for substantial reductions in the amount of ware that must be discarded for failing to meet target specifications.

The method includes periodically determining a shrinkage characteristic of a sample that is passed through the tunnel kiln. The shrinkage characteristic can, for example, be determined by first measuring the sample as an extruded green body, wherein at least one dimension of the green body is measured prior to the green body passing into the tunnel kiln. Later, the sample can be measured as a porous ceramic article, wherein the at least one dimension of the article is measured subsequent to the article passing out of the tunnel kiln. The shrinkage characteristic can then be determined by comparing the at least one measured dimension of the sample as an extruded green body with the at least one measured dimension of the sample as a porous ceramic article. Sampling (i.e., determining a shrinkage characteristic) can occur only on selected green bodies and articles passing through the tunnel kiln.

As used herein, the term "shrinkage characteristic" means a dimensional change of a sample (e.g., an extruded green body or a porous ceramic article) away from specified dimensions, for example, specified dimensions of a target specification. Such change can include the sample having a smaller measured dimension than a specified target dimension (shrinkage) or a sample having a larger measured dimension than a specified target dimension (growth).

The shrinkage characteristic can be determined by measuring one or more geometrical dimensions of the sample. For example, when the sample has a generally cylindrical shape, the shrinkage characteristic can be, at least in part, determined from the measured axial length of the sample. A sample having a generally cylindrical shape can have a circular, elliptical, or asymmetrical cross-section and, in such case, the shrinkage characteristic can, at least in part, be determined from the measured length of the major cross-sectional axis (i.e., the longest measured cross-sectional axis) of the sample.

In at least one set of exemplary embodiments, the shrinkage characteristic can be determined from both the measured axial length of the sample and at least the major cross-sectional axis of the sample. For example, the shrinkage characteristic can be determined from dimensions measured from at least two points along the perimeter of the sample and of at least one plane along the length of the sample using, for example, a laser gauge. In one exemplary set of embodiments, the shrinkage characteristic can be determined from dimensions measured at 24 points around the perimeter of the sample and then 3 to 5 planes along the length of the sample using a laser gauge, as described in U.S. patent application Ser. No. 12/550,620, the entire disclosure of which is incorporated herein by reference.

When the shrinkage characteristic of the sample is outside of a predetermined range, the top soak temperature (i.e., the highest temperature to which the sample is exposed in the tunnel kiln) is adjusted either upward or downward for a specified period of time. In this regard, the applicants have surprisingly found that such adjustment of the top soak temperature can compensate fully or at least partially for the shrinkage (or growth) that would otherwise occur without the adjustment. The applicants have also surprisingly found that the top soak temperature can be adjusted such that other physical and mechanical properties of the porous ceramic articles, such as porosity, pore diameter, coefficient of thermal expansion (CTE) and modulus of rupture (MOR), are not substantially adversely affected. Such adjustment can allow for increased production of porous ceramic articles that meet target specifications for a shrinkage characteristic (that otherwise would not have met the target specification without the adjustment), while at the same time keeping other physical and mechanical properties of the articles such as porosity, pore diameter, CTE, and MOR within the target specification as well.

In certain exemplary embodiments, the top soak temperature is adjusted downward if the shrinkage characteristic is above a predetermined amount. By "above a predetermined amount" or "above a predetermined set point" it is meant that the sample has shrunk more than a predetermined amount (in contrast, if the shrinkage characteristic is "below a predetermined amount" or "below a predetermined set point" it is meant that the sample has grown more than a predetermined amount or, alternatively stated, has experienced negative shrinkage).

In at least one set of exemplary embodiments, the top soak temperature is adjusted downward at least 5° C., such as between 5° C. and 10° C., and further such as between 6° C. and 8° C., including at least about 7° C. from a predetermined top soak temperature for every 0.2% that the shrinkage characteristic is above a predetermined set point.

Alternatively, the top soak temperature can be adjusted upward at least 5° C., such as between 5° C. and 10° C., and further such as between 6° C. and 8° C., including at least about 7° C. from a predetermined top soak temperature for every 0.2% that the shrinkage characteristic is negative (i.e., shows growth).

In embodiments disclosed herein, the top soak temperature can vary depending on the types of ceramic articles that are being manufactured. In certain exemplary embodiments, the top soak temperature ranges from 1380° C. to 1450° C., such as from 1400° C. to 1430° C.

The shrinkage characteristic can be periodically determined from at least one sample that can be designated as representing a plurality of articles that are passing through the kiln. For example, in the manufacture of porous ceramic articles, it is common to have a plurality of articles manufactured from a single ceramic precursor batch composition. Accordingly, in at least one set of exemplary embodiments, the at least one sample can be designated as representing all the articles manufactured from a given ceramic precursor batch composition. Then, as the articles manufactured from that batch composition are passed through the kiln, a next at least one sample can be designated as representing all the articles manufactured from the next ceramic precursor batch composition, and so forth.

For example, in certain exemplary embodiments disclosed herein, the shrinkage characteristic is determined for at least 1 out of every 1000, such as at least 1 out of every 500, and further such as at least 1 out of every 100 extruded green bodies or porous ceramic articles that pass through the tunnel kiln.

Ceramic precursor batch compositions used to manufacture ceramic articles in processes disclosed herein can comprise any number of a plurality of inorganic and organic ceramic forming ingredients. The inorganic ceramic-forming ingredients may be synthetically produced materials such as oxides, hydroxides, etc., or they may be naturally occurring minerals such as clays, talcs, or any combination of these. Embodiments disclosed herein are not limited to the types of powders or raw materials. These may be chosen depending on the properties desired in the ceramic articles.

In at least one set of exemplary embodiments, the ceramic precursor batch composition comprises cordierite-forming ingredients. One composition, by way of a non-limiting example, which ultimately forms cordierite upon firing is as follows in percent by weight: about 33-41, such as about 34-40 of aluminum oxide, about 46-53 such as about 48-52 of silica, and about 11-17 such as about 12-16 magnesium oxide.

In at least one set of exemplary embodiments, the ceramic precursor batch composition comprises aluminum titanate-forming ingredients. In other exemplary embodiments, the inorganic ceramic-forming ingredients may be those that yield mullite-forming ingredients, or mixtures of mullite and cordierite on firing, some examples of such mixtures being about 2% to about 60% mullite, and about 30% to about 97% cordierite, with allowance for other phases, typically up to about 10% by weight.

In at least one set of exemplary embodiments, if the shrinkage characteristic of the at least one sample is outside of a predetermined range, the top soak temperature is adjusted and maintained at the adjusted temperature until all or a majority of articles represented by the at least one sample have passed through the zone heated to a top soak temperature. For example, if the at least one sample represents the next 1000 articles passing through the tunnel kiln and the shrinkage characteristic of that at least one sample is outside of a predetermined range, the top soak temperature can be adjusted and maintained at that adjusted temperature until at least a majority of the next 1000 articles have passed through the zone heated to a top soak temperature. The top soak temperature can then be adjusted to a different temperature if the shrinkage characteristic of the at least one sample representing the next plurality of articles is outside of a predetermined range.

Because the top soak temperature cannot typically be changed instantaneously, the top soak temperature can be adjusted as the first article represented by the sample approaches the zone heated to a top soak temperature such that when the article actually reaches the zone heated to a top soak temperature, the temperature of the top soak zone has been changed to the adjusted temperature. The timing of this adjustment can depend on amount the temperature in the zone heated to a top soak temperature requires change, the rate at which the temperature in the zone heated to a top soak temperature can be changed, and the rate at which the sample is moving through the tunnel kiln.

For example, in a set of exemplary embodiments, the extruded green bodies are passed into the tunnel kiln in a plurality of vehicles traveling sequentially through the tunnel kiln and a plurality of extruded green bodies are placed on each vehicle. If, for example, the shrinkage characteristic of a sample is measured outside of a predetermined range such that the top soak temperature requires an adjustment of 10° C., one vehicle per hour is traveling through the tunnel kiln, and the temperature of the top soak zone can be adjusted at a rate of 2° C. per hour, the top soak temperature can be adjusted within 5 hours of the first article represented by the sample reaching the zone heated to a top soak temperature. The top soak zone temperature may then be maintained at the adjusted temperature until at least a majority of articles represented by the sample have passed through the zone heated to the top soak temperature. The top soak temperature can then be adjusted to a different temperature if the shrinkage characteristic of a sample representing the next plurality of articles is outside of a predetermined range. Specifically, the top soak temperature can be adjusted as the first article represented by the next sample approaches the zone heated to a top soak temperature such that when the article actually reaches the zone heated to a top soak temperature, the temperature of the top soak zone has been changed to the adjusted temperature.

In certain exemplary embodiments, the top soak zone may comprise a plurality of sub-zones which can each be individually heated to different temperatures than other sub-zones. In exemplary embodiments, the top soak zone may comprise at least 2 sub-zones, such as at least 5 sub-zones, and further such as at least 10 sub-zones, and yet further such as at least 20 sub-zones, including from 2 to 50 sub-zones and further including from 5 to 25 sub-zones, wherein each sub-zone can be individually heated to a different temperature than other sub-zones.

Accordingly, when the temperature of the top soak zone is adjusted, it need not be adjusted along the entirety of the top soak zone but may, instead, be adjusted along only a portion of the top soak zone or, in other words, adjusted in some sub-zones and not adjusted in other sub-zones. In this way, when a sample having a shrinkage characteristic that requires top soak zone temperature adjustment does not represent all of the articles that are passing through the top soak zone at a given time, the temperature of only those sub-zones through which articles represented by the sample are passing through can be adjusted whereas sub-zones through which articles not represented by the sample are passing through need not be adjusted. Alternatively stated, if the shrinkage characteristic of at least one sample is outside of a predetermined range, the top soak temperature can be adjusted by changing the temperature in one or more sub-zones sequentially as the articles represented by the at least one sample pass through the zone heated to a top soak temperature.

For example, if a top soak zone has 20 sub-zones, one vehicle is passed through each sub-zone per hour, 50 articles are placed on each vehicle, and a sample represents the next 500 articles passing through the tunnel kiln (in other words, the sample represents all of the articles on 10 consecutive vehicles), the zones occupied by the vehicles carrying articles represented by the sample can, if necessary, be adjusted whereas the zones occupied by vehicles carrying articles not represented by the sample need not be adjusted, such that the temperature profile in the top soak zone is adjusted dynamically sub-zone by sub-zone as the vehicles carrying articles represented by sample pass through the top soak zone.

Table 1 illustrates such dynamic temperature adjustment in the example described above where a shrinkage characteristic of a sample requires a downward top soak zone temperature adjustment of 9° C. for all articles represented by that sample, wherein the temperature in each sub-zone can be changed at a rate of 3° C. per hour. In the example shown in Table 1, all articles not represented by the sample (i.e., articles other than the next 500 passing through the kiln) do not require a top soak zone temperature adjustment from a predetermined set point ($T_s$). In Table 1, the top horizontal row represents the sub-zones in the top soak zone numbered from 1 to 20, the first vertical column represents time in hours, wherein time=0 represents the moment the first article represented by the sample first enters the top soak zone at sub-zone 1, and the rest of the entries in the table represent the temperature difference from $T_s$ of the sub-zone in ° C. at the indicated time.

TABLE 1

|    | 1  | 2  | 3  | 4  | 5  | 6  | 7  | 8  | 9  | 10 | 11 | 12 | 13 | 14 | 15 | 16 | 17 | 18 | 19 | 20 |
|----|----|----|----|----|----|----|----|----|----|----|----|----|----|----|----|----|----|----|----|----|
| 0  | −9 | −6 | −3 | 0  | 0  | 0  | 0  | 0  | 0  | 0  | 0  | 0  | 0  | 0  | 0  | 0  | 0  | 0  | 0  | 0  |
| 1  | −9 | −9 | −6 | −3 | 0  | 0  | 0  | 0  | 0  | 0  | 0  | 0  | 0  | 0  | 0  | 0  | 0  | 0  | 0  | 0  |
| 2  | −9 | −9 | −9 | −6 | −3 | 0  | 0  | 0  | 0  | 0  | 0  | 0  | 0  | 0  | 0  | 0  | 0  | 0  | 0  | 0  |
| 3  | −9 | −9 | −9 | −9 | −6 | −3 | 0  | 0  | 0  | 0  | 0  | 0  | 0  | 0  | 0  | 0  | 0  | 0  | 0  | 0  |
| 4  | −9 | −9 | −9 | −9 | −9 | −6 | −3 | 0  | 0  | 0  | 0  | 0  | 0  | 0  | 0  | 0  | 0  | 0  | 0  | 0  |
| 5  | −9 | −9 | −9 | −9 | −9 | −9 | −6 | −3 | 0  | 0  | 0  | 0  | 0  | 0  | 0  | 0  | 0  | 0  | 0  | 0  |
| 6  | −9 | −9 | −9 | −9 | −9 | −9 | −9 | −6 | −3 | 0  | 0  | 0  | 0  | 0  | 0  | 0  | 0  | 0  | 0  | 0  |
| 7  | −9 | −9 | −9 | −9 | −9 | −9 | −9 | −9 | −6 | −3 | 0  | 0  | 0  | 0  | 0  | 0  | 0  | 0  | 0  | 0  |
| 8  | −9 | −9 | −9 | −9 | −9 | −9 | −9 | −9 | −9 | −6 | −3 | 0  | 0  | 0  | 0  | 0  | 0  | 0  | 0  | 0  |
| 9  | −9 | −9 | −9 | −9 | −9 | −9 | −9 | −9 | −9 | −9 | −6 | −3 | 0  | 0  | 0  | 0  | 0  | 0  | 0  | 0  |
| 10 | −6 | −9 | −9 | −9 | −9 | −9 | −9 | −9 | −9 | −9 | −9 | −6 | −3 | 0  | 0  | 0  | 0  | 0  | 0  | 0  |
| 11 | −3 | −6 | −9 | −9 | −9 | −9 | −9 | −9 | −9 | −9 | −9 | −9 | −6 | −3 | 0  | 0  | 0  | 0  | 0  | 0  |
| 12 | 0  | −3 | −6 | −9 | −9 | −9 | −9 | −9 | −9 | −9 | −9 | −9 | −9 | −6 | −3 | 0  | 0  | 0  | 0  | 0  |
| 13 | 0  | 0  | −3 | −6 | −9 | −9 | −9 | −9 | −9 | −9 | −9 | −9 | −9 | −9 | −6 | −3 | 0  | 0  | 0  | 0  |
| 14 | 0  | 0  | 0  | −3 | −6 | −9 | −9 | −9 | −9 | −9 | −9 | −9 | −9 | −9 | −9 | −6 | −3 | 0  | 0  | 0  |
| 15 | 0  | 0  | 0  | 0  | −3 | −6 | −9 | −9 | −9 | −9 | −9 | −9 | −9 | −9 | −9 | −9 | −6 | −3 | 0  | 0  |
| 16 | 0  | 0  | 0  | 0  | 0  | −3 | −6 | −9 | −9 | −9 | −9 | −9 | −9 | −9 | −9 | −9 | −9 | −6 | −3 | 0  |
| 17 | 0  | 0  | 0  | 0  | 0  | 0  | −3 | −6 | −9 | −9 | −9 | −9 | −9 | −9 | −9 | −9 | −9 | −9 | −6 | −3 |
| 18 | 0  | 0  | 0  | 0  | 0  | 0  | 0  | −3 | −6 | −9 | −9 | −9 | −9 | −9 | −9 | −9 | −9 | −9 | −9 | −6 |
| 19 | 0  | 0  | 0  | 0  | 0  | 0  | 0  | 0  | −3 | −6 | −9 | −9 | −9 | −9 | −9 | −9 | −9 | −9 | −9 | −9 |

TABLE 1-continued

| | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 20 | 0 | 0 | 0 | 0 | 0 | 0 | 0 | 0 | 0 | −3 | −6 | −9 | −9 | −9 | −9 | −9 | −9 | −9 | −9 | −9 |
| 21 | 0 | 0 | 0 | 0 | 0 | 0 | 0 | 0 | 0 | 0 | −3 | −6 | −9 | −9 | −9 | −9 | −9 | −9 | −9 | −9 |
| 22 | 0 | 0 | 0 | 0 | 0 | 0 | 0 | 0 | 0 | 0 | 0 | −3 | −6 | −9 | −9 | −9 | −9 | −9 | −9 | −9 |
| 23 | 0 | 0 | 0 | 0 | 0 | 0 | 0 | 0 | 0 | 0 | 0 | 0 | −3 | −6 | −9 | −9 | −9 | −9 | −9 | −9 |
| 24 | 0 | 0 | 0 | 0 | 0 | 0 | 0 | 0 | 0 | 0 | 0 | 0 | 0 | −3 | −6 | −9 | −9 | −9 | −9 | −9 |
| 25 | 0 | 0 | 0 | 0 | 0 | 0 | 0 | 0 | 0 | 0 | 0 | 0 | 0 | 0 | −3 | −6 | −9 | −9 | −9 | −9 |
| 26 | 0 | 0 | 0 | 0 | 0 | 0 | 0 | 0 | 0 | 0 | 0 | 0 | 0 | 0 | 0 | −3 | −6 | −9 | −9 | −9 |
| 27 | 0 | 0 | 0 | 0 | 0 | 0 | 0 | 0 | 0 | 0 | 0 | 0 | 0 | 0 | 0 | 0 | −3 | −6 | −9 | −9 |
| 28 | 0 | 0 | 0 | 0 | 0 | 0 | 0 | 0 | 0 | 0 | 0 | 0 | 0 | 0 | 0 | 0 | 0 | −3 | −6 | −9 |
| 29 | 0 | 0 | 0 | 0 | 0 | 0 | 0 | 0 | 0 | 0 | 0 | 0 | 0 | 0 | 0 | 0 | 0 | 0 | −3 | −6 |

FIG. 1 is a schematic illustrating the construction of an exemplary embodiment of a tunnel kiln that may be used to effectuate processes as disclosed herein. In this embodiment, the tunnel kiln 10 comprises a vestibule region 12, a carbonaceous material release region 14, having a plurality of removal zones (z1-z11), located downstream of the vestibule region 12. Each of the removal zones includes a collection trap region (not shown) for collecting and preventing downstream movement of carbonaceous material. The kiln further comprises a sintering region 16 (partially shown) located downstream of the carbonaceous material release region 14. An exhaust removal system 18, for removing released carbonaceous material, is provided and operatively communicates with the removal zones of the release region 14.

The exhaust removal system 18 includes a plurality of offtake openings 20, specifically, at least one for each removal zone. It is these offtake openings 20, preferably located in the rooftop of the kiln for the associated removal zone, through which the released carbonaceous material, either in its volatilized or partially reacted form, is removed. Each of the offtake openings 20 operatively communicates with a secondary collector conduit 22. Although the embodiment illustrated herein details the offtake openings 20 as located in the rooftop, the important consideration regarding the location of the offtake openings 20 is that they be located in a position where the volatiles are most easily or efficiently removed, which, it should be noted may not always be the rooftop; e.g., sidewall or a position underneath the kiln.

Regarding the shape of the offtake opening, one skilled in the art can empirically determine, and thus incorporate into the tunnel kiln configuration, offtake openings of a shape which is most appropriate for the optimal and efficient removal of the released carbonaceous removal.

Each of the secondary collector conduits 22 operatively communicates with a main collector conduit 24. A damper valve 26 is preferably provided in each of the secondary collector conduits 22 upstream of the junction where the secondary 22 and main 24 collector conducts communicate. An exhaust fan operatively communicates with the main collector conduit 24 and functions to place a draw on the kiln firing atmosphere necessary for evacuating the released carbonaceous material. Furthermore, a damper valve 28 is provided in the main collector conduit 24. Each of the damper valves 26 can be adjusted so as to achieve the proper individual exhaust draw in each of the removal zones z1-z11, and in this way the removal of the released carbonaceous material can be shifted and/or varied from removal zone to removal zone. The overall control of the draw on the multiplicity of secondary conduits 22 and associated offtake openings 20 and the kiln firing atmosphere is controlled by adjustment of the damper valve 28.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention as set forth in the appended claims. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A method of manufacturing porous ceramic articles, comprising:
   a) forming a plurality of extruded green bodies from a ceramic precursor batch composition comprising a particle size distribution (PSD) defined by a mixture of raw materials used to form the ceramic batch precursor composition, wherein a target PSD is determined to results in a firing shrinkage of a porous ceramic article to a target specification dimension, and wherein the PSD changes from the target PSD;
   b) firing the extruded green bodies in a tunnel kiln comprising a zone through which each of the extruded green bodies pass, wherein the zone is heated to a top soak temperature to produce from each extruded green body a porous ceramic article that undergoes an amount of shrinkage or growth variability during said firing, wherein the amount of shrinkage or growth variability is defined by a shrinkage characteristic, and wherein the porous ceramic article has a porosity, a pore diameter, a coefficient of thermal expansion and a modulus of rupture;
   c) determining the shrinkage characteristic of at least one sample of the porous ceramic articles formed by said firing wherein the shrinkage characteristic is the amount of shrinkage or growth variability being a dimensional change of the porous ceramic article away from the target specification as caused by the change in the PSD of the ceramic batch precursor composition; and
   d) wherein, whenever the amount of shrinkage or growth variability as caused by the change in the PSD of the ceramic batch precursor composition is at least 0.2% above or at least 0.2% below the target specification: adjusting the top soak temperature based on the determined shrinkage characteristic to cause a change in the shrinkage characteristic of subsequently formed porous ceramic articles that reduces the amount of shrinkage or growth variability for each porous ceramic article; and e) wherein the adjusting of the top soak temperature includes either:
   i) a downward adjustment of between 5° C. and 10° C. from a predetermined top soak temperature for every 0.2% that the determined shrinkage characteristic is above the target specification; or
   ii) an upward adjustment of between 5° C. and 10° C. from a predetermined top soak temperature for every 0.2% that the determined shrinkage characteristic is below the target specification.

2. The method of claim 1, wherein the extruded green bodies and porous ceramic articles have a circular, elliptical or asymmetrical shape cross-section and the determining of the shrinkage characteristic comprises measuring a length of a major cross-sectional axis of the at least one sample as an extruded green body and as a porous ceramic article.

3. The method of claim 1, wherein the extruded green bodies and porous ceramic articles have an axial length and wherein the determining of the shrinkage characteristic comprises measuring the axial length of the at least one sample as an extruded green body and as a porous ceramic article.

4. The method of claim 1, wherein the top soak temperature is adjusted downward when the determined shrinkage characteristic is above a predetermined amount.

5. The method of claim 4, wherein the top soak temperature is adjusted downward at least 7° C. from a predetermined top soak temperature for every 0.2% that the determined shrinkage characteristic is above a predetermined set point.

6. The method of claim 1, wherein the top soak temperature is adjusted upward at least 7° C. from a predetermined top soak temperature for every 0.2% that the determined shrinkage characteristic is below a predetermined set point.

7. The method of claim 1, wherein the determined shrinkage characteristic is measured for at least 1 out of every 1000 of the extruded green bodies formed in act a).

8. The method of claim 1, wherein the adjusting of the top soak temperature occurs before the subsequently formed ceramic articles enter the zone heated to the top soak temperature.

9. The method of claim 8, wherein the adjusting of the top soak temperature is performed within 5 hours of the subsequently formed ceramic articles entering the zone heated to the top soak temperature.

10. The method of claim 1, wherein the extruded green bodies are passed into the tunnel kiln in a plurality of vehicles traveling sequentially through the tunnel kiln and a plurality of extruded green bodies are placed on each vehicle.

11. The method of claim 1, wherein the top soak zone comprises a plurality of sub-zones that can each be individually heated to different temperatures than other sub-zones.

12. The method of claim 11, wherein, if the shrinkage characteristic is outside of a predetermined range, the top soak temperature is adjusted by changing the temperature of all of the sub-zones.

13. The method of claim 11, wherein, when the shrinkage characteristic is outside of a predetermined range, the top soak temperature is adjusted by changing the temperature in only some of the sub-zones.

14. The method of claim 11, wherein, when the shrinkage characteristic is outside of a predetermined range, the top soak temperature is adjusted by changing the temperature in at least one sub-zone sequentially as the subsequently formed ceramic articles-pass through the zone heated to the top soak temperature.

15. The method of claim 1, wherein the ceramic precursor batch composition comprises cordierite-forming ingredients.

16. The method of claim 1, wherein the ceramic precursor batch composition comprises aluminum titanate-forming ingredients.

17. The method of claim 1, wherein the top soak temperature ranges from 1380° C. to 1450° C.

18. The method of claim 1, wherein the change in the PSD of the ceramic batch precursor composition is caused by a change in a PSD of at least one of the raw materials.

* * * * *